United States Patent [19]

Sorensen, III

[11] Patent Number: 4,835,381
[45] Date of Patent: May 30, 1989

[54] WIDE FIELD OF VIEW RADIANT ENERGY RECEIVER

[75] Inventor: Peter Sorensen, III, Garland, Tex.

[73] Assignee: Varo, Inc., Garland, Tex.

[21] Appl. No.: 114,787

[22] Filed: Oct. 30, 1987

[51] Int. Cl.$^4$ ............................................. H01J 5/16
[52] U.S. Cl. .................................... 250/227; 356/152
[58] Field of Search .......................... 250/227, 203 R; 356/141, 152

[56] References Cited

U.S. PATENT DOCUMENTS

| | | | |
|---|---|---|---|
| 3,885,878 | 5/1975 | Ishak | 250/227 |
| 4,356,396 | 10/1982 | Ruell et al. | 250/227 |
| 4,362,931 | 12/1982 | Maruko et al. | 250/203 R |
| 4,427,881 | 1/1984 | Ruell | 250/227 |

Primary Examiner—Edward P. Westin
Assistant Examiner—Khaled Shami
Attorney, Agent, or Firm—Baker, Mills & Glast

[57] ABSTRACT

A source discriminator comprises a diffusing surface (10) provided to receive radiant energy over a wide field of view. Radiant energy received is transmitted from the diffusing surface (10) along an optical fiber (12) of a preselected numerical aperture to a radiant energy filter or grating (18). The numerical aperture of the optical fiber is preselected to provide an acceptable half-cone of arrival of radiant energy at the filter or grating (18). From the radiant energy filter or grating (18), the radiant energy passes to photosensors, the output signals of which are used; is the source discriminator system.

19 Claims, 1 Drawing Sheet

WIDE FIELD OF VIEW RADIANT ENERGY RECEIVER

TECHNICAL FIELD OF THE INVENTION

This invention relates to methods and apparatus for detecting optical energy, more particularly to electro-optics and threat warning systems which use diffusing surface apparatus and methods for receiving radiant energy from a wide field of view.

BACKGROUND OF THE INVENTION

U.S. Pat. No. 3,992,099 to Laughlin, incorporated herein by reference, discloses a source discriminator for measuring the angle of arrival and wavelength of beams of radiant energy. Such a system is useful in combat applications to provide information about the source of ranging laser beams and the like. The source discriminator described in the Laughlin patent includes first and second planar radiant energy detectors transversely oriented at a predetermined angle relative to one another to receive radiant energy. Each of the detectors produces an electrical output signal corresponding to radiant energy which impinges on the detector, the output signals are used to determine the angle of arrival and wavelength of the radiant energy impinging on the planar detectors. The detectors have an angular response approximated by the cosine function.

In some applications of source discriminators such as described in the Laughlin patent, it has been found to be desirable to locate the radiant energy detectors at a position remote from the site where the radiant energy is received by the device. In such applications where the detectors are remotely located, it is desirable to provide radiant energy receivers which can receive radiant energy from a wide field of view, preferably as great as 180°, and then transmit that radiant energy received to the radiant energy detectors. It is also desirable to provide a bandpass filtering of the radiant energy received. This serves to filter out the background signal of the radiant energy received by the system and increase the signal to noise ratio of the specific wavelengths of light being monitored compared to the background signal. It is also desirable to provide a source discriminator apparatus with a minimum number of parts and a minimum size.

However, it has been found that the combination of these objectives is not easily accomplished in a source discriminator. Moreover, these objectives have not been suitably accomplished by prior art devices. For example, it has been found that traditional means of meeting the objectives of providing a wide angle field of view and increasing the signal to noise ratio (i.e., providing an optical band pass filtering) are mutually limiting.

A typical method of increasing the signal to noise ratio of a radiant energy signal is to pass the signal through a bandpass filter. The bandpass filter blocks most wavelengths of the radiant energy and transmits primarily only the radiant energy having a wavelength corresponding to the predetermined bandpass wavelengths for the particular filter. The median wavelength of the bandpass is termed the central wavelength. A commonly used type of bandpass filter is a dielectric bandpass filter. Dielectric bandpass filters, however, are subject to the phenomena that when the angle of incidence of radiant energy arriving at the filter varies from a direction normal to the surface of the filter, the center wavelength of the radiant energy transmitted by the filter is shifted towards shorter wavelengths. Such wavelength shifting adversely affects the accuracy of a source discriminator in which the bandpass filter is used.

Most simple wide angle lenses which might be suggested for source discriminator applications, however, have a short focal length. The short focal length of the lenses dictates that the lenses also have a focusing cone with a relatively large half-angle.

When such a wide angle lens is used in conjunction with a dielectric bandpass filter, the relatively large half-angle of the lens focusing cone defines the angle of incidence of radiant energy to the filter. The consequent relatively large angle of incidence results in an undesirable center wavelength shift in the transmission through the filter, which in turn results in unacceptable accuracy losses in the source discriminator device.

It has been proposed to use lenses having longer focal lengths with the source discriminator. The longer focal length lenses have a focusing cone with a smaller half-angle which coincides more favorably with the small half-angle of acceptance of the optical band pass filter. However, these longer focal length lenses have a limited field of view and so do not meet the objective of providing a wide field of view. Moreover, even the short focal length wide-angle lenses do not provide a field of view approaching 180°.

An additional problem arising in the use of such source discriminator systems is that the photosensors of such systems are frequently sensitive to the polarization of the radiant energy being received. Thus, the signal generated by the photosensor varies depending on the polarization of the light being sensed. To avoid inaccuracies which arise from this sensitivity to polarization, it is desirable that the radiant energy receiving system depolarize the radiant energy received prior to transmitting the radiant energy to photosensors.

The need has thus arisen for an improved wide field of view radiant energy receiver which receives radiant energy over a wide field of view, but which transmits such radiant energy to a filter at an acceptably small half-angle of arrival and which also depolarizes radiant energy received by the system.

SUMMARY OF THE INVENTION

The present invention comprises apparatus and methods for receiving radiant energy over a wide field of view and also for filtering the radiant energy received to increase the signal to noise ratio. A diffusing surface is provided to receive radiant energy over the desired wide field of view. The radiant energy received is transmitted from the diffusing surface along an optical fiber of a preselected numerical aperture to a radiant energy filter or grating. The numerical aperture of the optical fiber is preselected to provide an acceptable half-angle of arrival of radiant energy at the filter or grating. From the radiant energy filter or grating, the radiant energy passes to photosensors, the output signals of which are used in the source discriminator system.

The filter or grating may comprise a bandpass filter, particularly a dielectric band pass filter, a holographic grating, a diffraction grating or other type of filter or optical element.

The diffusing surface can be provided by a number of techniques including treatments to a receiving end of the optical fiber or providing a separate diffusing surface which transmits light to a receiving end of the optical fiber.

The present invention also serves to depolarize radiant energy received by the system.

BRIEF DESCRIPTION OF THE DRAWINGS

For a more complete understanding of the invention and the advantages thereof, reference is now made to the following description, taken in conjunction with the accompanying drawings in which.

DETAILED DESCRIPTION OF THE INVENTION

The present invention avoids the above noted problems of excess center wavelength shift, limited field of view and polarization of detected radiant energy.

The present invention utilizes a diffusing surface, as compared to a conventional lens system, to receive radiant energy over a wide field of view. The received radiant energy is transmitted from the diffusing surface along an optical fiber of a preselected numerical aperture to a radiant energy filter or grating. The optical fiber is selected to transmit the radiant energy to the filter or grating in a transmission cone of a predetermined acceptable low half-cone angle.

Figure 1:
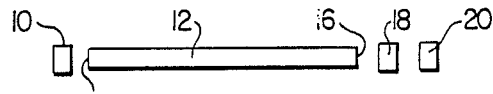
FIG. 1 is a diagrammatic side view of an apparatus for receiving radiant energy over a wide angle field of view in accordance with one embodiment of the present invention.

FIG. 1 shows a diagrammatic side view of an apparatus for receiving radiant energy over a wide angle field of view according to an embodiment of the present invention. A diffusing surface 10 is provided to receive radiant energy over a wide field of view. An optical fiber 12, having a preselected numerical aperture and also having a receiving end 14 and a transmitting end 16, receives radiant energy from the diffusing surface 10 at the receiving end 14. The radiant energy is transmitted along the length of the optical fiber and from the transmitting end 16 to an optical band pass filter 18. A preselected band pass of the radiant energy is passed from the band pass filter 18 to a photosensor 20. The numerical aperture of the optical fiber 12 is preselected so that the transmission cone from the optical fiber is such as to provide an acceptable half-angle of arrival of radiant energy at the band pass filter 18. The band pass filter 18 filters out background signals from the radiant energy received. The filter 18 transmits principally only radiant energy of the wavelengths to be monitored by the source discriminator.

The term "diffusing surface" as used herein will be understood to mean a transmitting diffusing surface designed to transmit radiant energy through the diffusing surface as compared to a reflecting diffusing material which is not designed to transmit radiant energy through the material. The diffusing surface serves to diffuse radiant energy passing through the surface by multiple scattering of the radiant energy by particles in or other characteristics of the diffusing surface. The diffusing surface used in the present invention can be an optical element that is coupled to the receiving end of the optical fiber or can be the result of a treatment to the end of the fiber itself.

Diffusing surfaces are known in the art and can be prepared by grinding a glass, plastic or other surface, etching the surface by chemical or other means, or depositing radiant energy or light scattering materials on a carrier such as a glass or plastic plate. Examples of such light scattering materials include opal, $TiO_3$, $AlO_3$, or other materials known in the art. In some cases, such light scattering materials are applied to the surfaces which have been etched or ground. Additionally, a diffusing surface may be provided by use of a material which in itself serves to scatter radiant energy transmitted through the substance. One example of a diffusing surface is an opal glass which comprises an opal layer of 5/1000 inch thickness deposited on top of a clear glass carrier plate of 10/1000 inch thickness. An example of a commercially available opal glass is Part No. 214.9 from Edmund Scientific Corporation.

Figure 2:
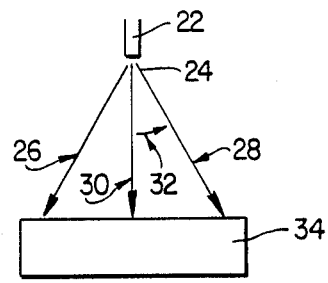
FIG. 2 is a diagrammatic side view of the transmission cone of radiant energy transmitted from an optical fiber to a bandpass filter.

FIG. 2 is a diagrammatic side view of the transmission cone of radiant energy transmitted from an optical fiber to a band pass filter. Shown at 22 is an optical fiber having a transmitting end 24 from which is transmitted radiant energy. Light transmitted by an optical fiber is emitted in a conical emittance pattern. The geometry of the emittance cone is affected by the characteristics of the fiber optic and, as known in the art, can be correlated to the numerical aperture of the optical fiber. Also shown in FIG. 2 are lines 26 and 28 representing a symmetrical cone of radiation from transmitting end 24. Also shown is the centroid 30 of the cone. Angle 32 is termed the half-cone angle of the emittance cone. In FIG. 2, the centroid 30 of the cone is normal to the surface of band pass filter 34. The numerical aperture (NA) is related to the half-cone angle by the relationship $NA = \eta_o \sin U$, where $\eta_o$ is relevant refractive index and U is the half-cone angle.

Figure 3:
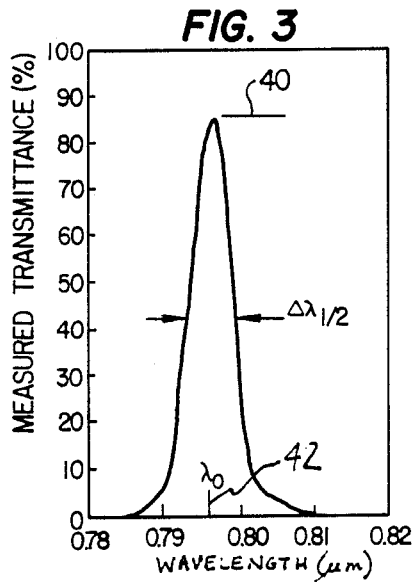
FIG. 3 is a chart illustrating the transmission of a narrow bandpass filter.

FIG. 3 shows a chart illustrating the transmission of a narrow band pass filter. As shown in FIG. 3, the percent transmittance is graphed as a function of wavelength. Shown at 40 is the point of maximum transmittance. Shown at 42 is the center wavelength which is at the center of the pass band of the filter.

The center wavelength of a bandpass filter is a function of the angle of incidence of radiant energy to the optical filter surface. For non-normal incidence, this center wavelength is shifted toward shorter wavelengths. An approximation of the amount of shift in the center wavelengths is given by:

$$\lambda_\theta = \lambda_o \frac{(\eta^2 - \sin^2\theta)^{\frac{1}{2}}}{\eta}$$

where
 $\lambda_\theta$ = central wavelength at angle of incidence $\theta$
 $\lambda_o$ = central wavelength at normal incidence
 $\eta$ = effective index of refraction of the filter
 $\theta$ = angle of incidence.

Figure 4:
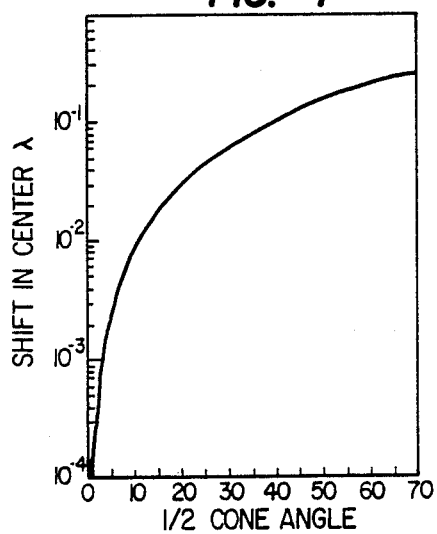
FIG. 4 is a chart of the center wavelength shift of a typical narrow bandpass filter as a function of the half-cone angle of the radiant energy arriving at the filter.

FIG. 4 shows a diagram of the center wavelength shift of a typical narrow band pass filter as a function of the half-cone angle of the radiant energy arriving at the filter. FIG. 4 shows that the wavelength shift increases as the half-cone angle increases.

The amount of wavelength shifting, and, conjunctly, the angle of incidence, which is tolerable for a source discriminator, varies with the particular design of the source discriminator. In one source discriminator application designed to monitor radiant energy having a central wavelength of about 1064 nanometers and using a narrow dielectric bandpass filter with a bandpass of 20 nanometers from 1054 to 1074 nanometers, it has been found that an unacceptable center wavelength shifting occurs at angles of incidence above 15°. Moreover, in this application a preferred maximum angle of incidence is less than 10°.

Figure 5:
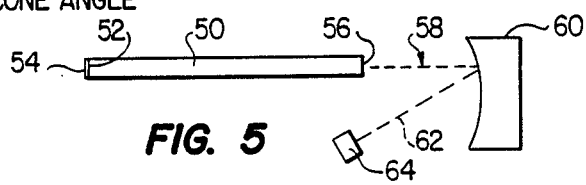
FIG. 5 shows a diagrammatic side view of an embodiment of the present invention wherein a concave holographic grating is used to isolate the particular wavelength bands being monitored.

FIG. 5 shows an embodiment of the present invention wherein a concave holographic grating is used to isolate the particular wavelength bands being monitored. Shown in FIG. 5 is an optical fiber 50 having a receiving end 52. Receiving end 52 has been treated as is known in the art to provide a diffusing surface 54 on the receiving end 52. Optical fiber 50 also comprises a transmitting end 56 from which radiant energy received by the optical fiber is transmitted in a direction shown in FIG. 5 by dotted line 58 to a concave holographic grating 60. Radiant energy from the concave holographic grating 60 is transmitted as shown in FIG. 5 by dotted line 62 to a radiant energy sensor 64. Holographic grating 60 serves to break up into its spectral components the radiant energy received and to isolate the predetermined wavelengths to be monitored. Sensor 64 is positioned to receive the predetermined wavelengths isolated by grating 60. An output signal from the sensor 4 is used in the source discriminator.

In source discriminators according to the present invention, radiant energy is received by at least two diffusing surfaces transversely oriented relative to one another and having an angular response approximated by the cosine function as explained in the Laughlin patent.

Figure 6:
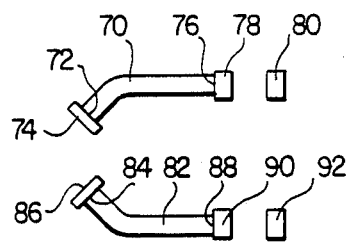
FIG. 6 shows a diagrammatic top view of a source discriminator according to the present invention, showing first and second diffusing surfaces transversely oriented relative to one another at a predetermined angle to receive radiant energy.

FIG. 6 shows an embodiment of a source discriminator according to the present invention, showing two diffusing surfaces for receiving radiant energy as well as other components. The device of FIG. 6 comprises a first optical fiber 70, having a receiving end 72 which is disposed to receive radiant energy from a first diffusing surface 74. First optical fiber 70 also comprises a transmitting end 76 which is disposed to transmit radiant energy to a first bandpass filter 78. A first radiant energy detector 80 is disposed to receive radiant energy from the first bandpass filter 78. The device of FIG. 6 also comprises a second optical fiber having a receiving end 84 disposed to receive radiant energy from a second diffusing surface 86. Second optical fiber 82 also comprises a transmitting end 88 disposed to transmit radiant energy to a second bandpass filter 90. A second radiant energy detector 92 is disposed to receive radiant energy from the second bandpass filter 90. Output signals from the first and second radiant energy detectors, 80 and 92 respectively, are used in the source discriminator to determine the direction and wavelength of radiant energy received at a first and second diffusing surfaces, 74 and 86, respectively.

In source discriminators according to the present invention, a plurality of optical fibers can be used. For example, in the embodiment shown in FIG. 6, first optical fiber 70 may be understood to be representative of a first plurality of optical fibers which transmit radiant energy from first diffusing surface 74 to bandpass filter 78. In most cases, an increased number of optical fibers will provide an increased signal to the radiant energy detectors of the system. The increased signal strength can serve to increase the accuracy of the source discriminator.

Figure 7:
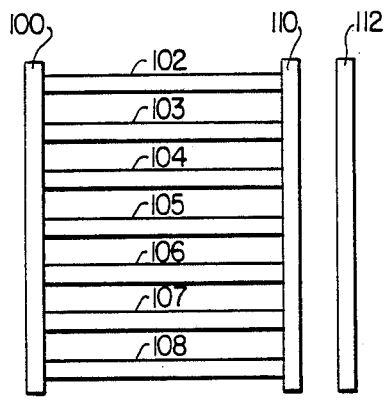
FIG. 7 shows a diagrammatic side view of an embodiment of the present invention, wherein a plurality of optical fibers is used to transmit radiant energy from a diffusing surface.

FIG. 7 shows an embodiment of the present invention comprising a plurality of optical fibers to transmit radiant energy from a diffusing surface. Shown in FIG. 7 is a diffusing surface 100. Disposed to receive radiant energy from diffusing surface 100 are optical fibers 102 through 108. Disposed o receive radiant energy from optical fibers 102 through 108 is a bandpass filter 110. Disposed to receive radiant energy from bandpass filter 110 is a radiant energy detector 112.

It will be understood that the diffusing surface 100 of FIG. 7 may corresponds to a first diffusing surface of the device of FIG. 6. A second diffusing surface with a second plurality of optical fibers, similar to that of FIG. 7, correspond to the second diffusing surface of the device of FIG. 6. In alternate embodiments of the present invention, the device of FIG. 7 can be adapted so that each of optical fibers 102 through 108 receives radiant energy from a separate diffusing surface for each optical fiber. Such an embodiment could be effected so long as, among other requirements, the diffusing surfaces of the first plurality of optical fibers are parallel with each other and are transversely oriented at a predetermined angle relative to the diffusing surfaces of the second set of optical fibers. Additionally, in alternate embodiments, each of the optical fibers 102 through 108 could be disposed to transmit radiant energy to a separate bandpass filter or other filter or grating for each optical fiber. So also, in alternate embodiments of the present invention, each of the optical fibers 102 through 108 may 5 be disposed so as to transmit radiant energy to a separate radiant energy detector for each optical fiber.

Other types of filters besides dielectric band pass filters may be used in conjunction with the present invention. For example, a concave holographic grating may be used to isolate the particular wavelength bands being monitored. Also, a diffraction grating may be used for the same purpose. Additionally, other filtering or diffraction elements may be used as desired.

The present invention is illustrated by the following example.

EXAMPLE 1

An opal glass, Part No. 214.9 from Edmund Scientific Corporation, was used as a diffusing surface. Operably connected to the transmitting side of the opal glass, by optical grease, was an optical fiber having a numerical aperture of 0.35. A transmitting end of the optical fiber directed radiant energy to a cut-on filter, Wratten No. 89B manufactured by Kodak. This cut-on filter is specified to cut on at a wavelength of about 800 nanometers. Positioned to receive radiant energy from the optical fiber through the filter was a silicon photodiode Part No. Hamamatsu S1336-8BK, with a spectral response of 320 to 1150 nanometers.

The device was tested exposing the diffusing surface to radiant energy sources positioned at different angles on the field of view of the diffusing surface. Several radiant energy sources were used in the testing. These included a gallium arsenide laser diode which emitted radiant energy at approximately 905 nanometers, a gallium arsenide LED which emitted light at approximately 950 nanometers, and a neodymium-YAG laser which emitted at approximately 1064 nanometers. The device was also tested by exposure to radiant energy produced by a helium neon laser which emitted radiant energy at approximately 632 nanometers. With the helium neon laser testing, the cut-on filter was removed from the system.

Testing indicated that radiant energy was successfully received over a field of view in excess of 175°, and approaching 180°, and transmitted to the photosensor. It was also found that the center wavelength shifting through the cut-on filter was acceptably low. It was also found that the system served to depolarize radiant energy received at the diffusing surface. Depolarizing the radiant energy received is advantageous, particularly inasmuch as it reduces inaccuracies which arise from photo detector sensitivity to polarization.

The present invention, additionally, has particular advantages when used in conjunction with a holographic grating. Holographic gratings are preferably available with a largest aperture of F/1.0. Accordingly, these preferred holographic gratings can accept radiant energy from an emittance pattern having a maximum half cone angle of 26.6°.

Preferable ranges of numerical apertures for optical fibers according to the present invention, are from 0.2 to 0.44, and less preferably, less than 0.64.

When a dielectric bandpass filter is used in embodiments of the present invention, relatively narrow bandpasses such as 20 nanometers, are preferred. More preferably, a bandpass of approximately 10 nanometers is used. The more narrow bandpass provides an increased signal to noise ratio for the particular wavelength of radiant energy being monitored.

While the present invention has been described with respect to preferred embodiments, it is to be understood that the invention is capable of numerous modifications by arrangements and changes that are within the scope of the invention, as defined by the appended claims.

What is claimed is:

1. Apparatus for receiving radiant energy in a radiant energy source discriminator, comprising:
   a fiber optic having a receiving end and a transmitting end;
   a diffusing surface for receiving radiant energy disposed over a wide field of view at the receiving end of said fiber optic such that radiant energy received over said wide field of view at said diffusing surface is depolarized and transmitted through said diffusing surface to said receiving end of said optical fiber;
   an optical filter disposed at said transmitting end of said optical fiber so that radiant energy transmitted from said transmitting end of said optical fiber is operably received by said optical filter; and
   a photosensor disposed to receive, from said optical filter, radiant energy transmitted from said transmitting end of said optical fiber to said optical filter.

2. The apparatus of claim 1, wherein said optical filter comprises a band pass optical filter.

3. The apparatus of claim 2, wherein said band pass optical filter comprises a dielectric filter.

4. The apparatus of claim 3, wherein said dielectric filter has an optical band pass of less than 25 nanometers.

5. The apparatus of claim 1, wherein said optical filter comprises a holographic grating.

6. The apparatus of claim 5, wherein said holographic grating has a F number of 1.0 or less.

7. The apparatus of claim 1, wherein said optical fiber has a numerical aperture of less than 0.44.

8. The apparatus of claim 4, wherein said band pass filter transmits a center wavelength of 1064 nanometers with a band pass of less than 30 nanometers.

9. The apparatus of claim 1, wherein said optical filter comprises a diffraction grating.

10. The apparatus of claim 2, wherein said band pass filter comprises a dye type filter.

11. The apparatus of claim 1, wherein said apparatus serves to receive radiant energy at said diffusing surface over a field of view of at least 170°.

12. A method for reducing wavelength shift in dielectric band pass filters in wide angle field of view source discriminator systems, said method comprising:
   receiving radiant energy on a substantially planar diffusing surface, said diffusing surface serving to receive radiant energy over a wide angle field of view and to depolarize the received radiant energy;
   transmitting at least a portion of the received radiant energy along an optical fiber having a preselected numerical aperture;
   transmitting at least a portion of the received radiant energy form said optical fiber to a dielectric filter having a preselected band pass;
   transmitting at least a portion of the received radiant energy from said dielectric filter to a photosensor; and
   generating a signal at said photosensor correlating to said radiant energy received at said photosensor.

13. The method of claim 12, wherein said numerical aperture of said optical fiber is preselected such that radiant energy transmitted from said optical fiber to said dielectric filter arrives at said dielectric filter at a half-angle of arrival which does not result in an undesirable high center wavelength shift in the dielectric filter.

14. The method of claim 13, wherein said half-angle of arrival is less than 18°.

15. The method of claim 15, wherein said half-angle of arrival is less than 10°.

16. The method of claim 14, wherein said preselected numerical aperture is less than 0.45.

17. The method of claim 14, wherein said dielectric filter has a band pass of approximately 20 nanometers.

18. The method of claim 13, wherein said diffusing surface comprises an opal glass.

19. The method of claim 13, wherein said diffusing surface comprises a diffusing surface formed on a receiving end of said optical fiber.

* * * * *